United States Patent
Myong

(10) Patent No.: US 10,819,063 B1
(45) Date of Patent: Oct. 27, 2020

(54) SEALED ELECTRIC TERMINAL WITH ADHESIVE FLOW-OUT RETARDER

(71) Applicant: TE CONNECTIVITY CORPORATION, Berwyn, PA (US)

(72) Inventor: Inho Myong, Newark, CA (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 0 days.

(21) Appl. No.: 16/553,734

(22) Filed: Aug. 28, 2019

(51) Int. Cl.
*H01R 4/02* (2006.01)
*H01R 13/52* (2006.01)
*H01R 4/20* (2006.01)
*H02G 15/18* (2006.01)
*H01R 4/72* (2006.01)

(52) U.S. Cl.
CPC ......... *H01R 13/5221* (2013.01); *H01R 4/029* (2013.01); *H01R 4/20* (2013.01); *H01R 4/72* (2013.01); *H02G 15/1806* (2013.01)

(58) Field of Classification Search
CPC ...... H01R 13/5221; H01R 4/20; H01R 4/029; H01R 4/72; H02G 15/1806
USPC .......................................................... 439/271
See application file for complete search history.

(56) References Cited

U.S. PATENT DOCUMENTS

| | | | | |
|---|---|---|---|---|
| 5,118,313 A * | 6/1992 | Delalle | ..................... | H01R 4/72 439/730 |
| 5,137,478 A * | 8/1992 | Graf | ...................... | H01R 4/723 174/84 R |
| 6,015,953 A * | 1/2000 | Tosaka | ..................... | H01R 4/20 174/79 |
| 6,423,952 B1 * | 7/2002 | Meisiek | .................... | H05B 3/06 219/541 |
| 8,262,408 B1 * | 9/2012 | Kelly | ................... | H01R 9/0524 439/578 |
| 9,601,866 B1 * | 3/2017 | Petersen | .................. | H01R 4/72 |
| 2001/0003688 A1 * | 6/2001 | Kondo | ............. | B29C 45/14426 439/604 |
| 2005/0003709 A1 * | 1/2005 | Nagamine | ............ | H01R 43/005 439/587 |
| 2007/0072455 A1 * | 3/2007 | Onuma | ................ | H01R 9/0518 439/98 |
| 2010/0048051 A1 * | 2/2010 | Melni | ...................... | H01R 4/12 439/271 |
| 2011/0097948 A1 * | 4/2011 | Melni | ...................... | H01R 9/11 439/733.1 |
| 2011/0177727 A1 * | 7/2011 | Zhao | ....................... | H01R 4/72 439/874 |
| 2012/0318575 A1 * | 12/2012 | Koto | ........................ | H01R 4/72 174/840 |
| 2013/0344723 A1 * | 12/2013 | Peters | .................... | H01R 4/203 439/275 |

(Continued)

*Primary Examiner* — Abdullah A Riyami
*Assistant Examiner* — Nelson R. Burgos-Guntin

(57) ABSTRACT

An electrical terminal having a terminal attachment portion, a wire attachment portion and a transition portion. The wire attachment portion is configured to receive wires of a cable therein. The transition portion extends between the terminal attachment portion and the wire attachment portion. A flow barrier is provided on the transition portion proximate an end of the transition portion. The flow barrier constrains an adhesive/sealant applied to the wires positioned in the wire attachment portion from flowing from the wire attachment portion to the terminal attachment portion.

17 Claims, 3 Drawing Sheets

(56) References Cited

U.S. PATENT DOCUMENTS

| | | | |
|---|---|---|---|
| 2014/0284099 A1* | 9/2014 | Saito | H01B 7/0009 |
| | | | 174/70 R |
| 2015/0244159 A1* | 8/2015 | Seifert | H01R 4/72 |
| | | | 174/77 R |
| 2016/0064120 A1* | 3/2016 | Wakabayashi | B60R 16/0215 |
| | | | 174/72 A |
| 2016/0286697 A1* | 9/2016 | Degen | H01R 31/02 |
| 2018/0226731 A1* | 8/2018 | Sethi | H01R 4/72 |
| 2018/0226742 A1* | 8/2018 | Sethi | H01R 13/5216 |
| 2018/0233835 A1* | 8/2018 | Schmidt | H01R 4/184 |
| 2018/0301886 A1* | 10/2018 | Yamasaki | H01B 19/00 |
| 2018/0323519 A1* | 11/2018 | Sethi | H01R 13/5216 |
| 2018/0358712 A1* | 12/2018 | Suenaga | H01R 4/58 |

* cited by examiner

SEALED ELECTRIC TERMINAL WITH ADHESIVE FLOW-OUT RETARDER

FIELD OF THE INVENTION

The invention is directed to sealed electrical terminal which prevents the out flow of adhesive from the sealed portion. In particular, the invention is directed to a sealed electrical terminal that includes a device to prevent the flow of sealant/adhesive from heat shrink tubing which is used to seal ring terminals and other types of terminals.

BACKGROUND OF THE INVENTION

Ring terminals are typically used to attach electrical wires to studs or posts (such as those found on vehicle batteries and other batteries) and are manufactured in various types and sizes. Ring terminals typically include a ring portion and a wire attachment/connection portion to which electrical wires are connected by welding or other means. Non-insulated ring terminals can be crimped or soldered and may be finished off with heat shrink tubing to insulate and protect the connection formed between the electrical wires and the wire attachment portion of the terminal. Heat shrink tubing (HST) is a shrinkable plastic tube often used to insulate electrical wires. The HST may have discrete sealant materials installed therein. HST provides abrasion resistance and environmental sealing protection for stranded and solid wire conductors, connections, joints, and terminals used in various electrical applications. HST can also be used to repair damaged insulation on electrical wires, bundle wires together, and to create cable entry seals. As stated above, HST may be a single-walled system or a multi-walled system, wherein the multi-walled system includes at least one heat-shrinkable layer and at least one layer of a sealant system. Heat shrink tubing is commonly manufactured from fluoropolymer or polyolefin, which shrinks radially when heated. The process of shrinking an HST is referred to as "recovering" an HST and the predetermined temperature at which a HST starts to recover is referred to as its "recovery temperature". As an HST recovers, i.e., shrinks, it exerts an inward force against the items it surrounds, which is referred to as the "hoop stress" of the HST. More specifically, hoop stress (also known as cylinder stress) is the force exerted circumferentially (perpendicular both to the axis and to the radius of the object) in both directions on every particle in the tubing or cylinder wall. The degree of hoop stress is determined by certain HST characteristics such as the type of base material, wall thickness, degree of cross-linking, and degree of expansion. Hoop stress is also affected by process parameters such as temperature of recovery and degree of recovery.

Ring terminals currently used with passenger and commercial vehicle or aircraft electrical systems include single-wire and multi-wire configurations. External sealant systems that include the use of heat shrink tubing and an adhesive/sealant layer have been previously used to create a water-tight seal in between and outside of the electrical wires attached to the terminal. However, existing sealant systems and methods may not properly seal the electrical wires in a simple and reliable manner. A first problematic issue involves the flow or oozing of excessive adhesive or sealant onto the ring portion of the ring terminal. Adhesive that is present on the ring portion can interfere with the metal to metal contact that is needed for an effective electrical contact, thereby requiring cleaning of the excess adhesive. A second problematic situation also involves the flow or oozing of adhesive or sealant out of the desired area, causing the minimal and uneven distribution of the adhesive or sealant, particularly around corners or areas which the recovery of the heat shrink tubing causes increase pressure. This is particularly evident when round shrink tubing shrinks or recovers onto a rectangular or square terminal or substrate. In such case, corners of the rectangular cross section terminal exerts excessive pressure, causing that area to be lacking in adhesive or sealant material. The lack of adhesive or sealant provides a path for contaminants and water to affect the electrical connection between the wires and the terminals. For example, moisture or water can wick from the ring portion of the terminal onto the wire attachment portion of the terminal, then onto the attached electrical wires, and then from one end of the electrical wires to the other end thereof through the welded or crimped interface; water can also wick from in between the wires and into the terminal.

To overcome the limitations of sealing systems that involve the use of external adhesive and heat shrink tubing, the industrial approach currently used involves a multi-component, multi-step process. This process is labor intensive and expensive; therefore, there is an ongoing need for a sealing system for use with ring terminals that meets all functional requirements in a simplistic, reliable, and cost-effective manner.

It would, therefore, be beneficial to provide a sealed electrical terminal and method for sealing ring terminals and other types of terminals which is easy to implement and cost effective.

SUMMARY OF THE INVENTION

The following provides a summary of certain illustrative embodiments of the present invention. This summary is not an extensive overview and is not intended to identify key or critical aspects or elements of the present invention or to delineate its scope.

An embodiment is directed to an electrical terminal having a terminal attachment portion, a wire attachment portion and a transition portion. The wire attachment portion is configured to receive wires of a cable therein. The transition portion extends between the terminal attachment portion and the wire attachment portion. A flow barrier is provided on the transition portion proximate an end of the transition portion. The flow barrier constrains an adhesive/sealant applied to the wires positioned in the wire attachment portion from flowing from the wire attachment portion to the terminal attachment portion.

An embodiment is directed to an assembly of an electrical terminal with a cable terminated thereto. The assembly includes the terminal which has a terminal attachment portion, a wire attachment portion for receiving the cable therein, and a transition portion which extends between the terminal attachment portion and the wire attachment portion. A flow barrier is provided on the transition portion proximate an end of the transition portion. The cable has wires and an insulation sleeve. A sealing device is provided on the cable and extends over the wire attachment portion of the terminal. The sealing device is a heat shrinkable tubing with an adhesive/sealant provided therein. The flow barrier constrains the adhesive/sealant from flowing from the wire attachment portion to the terminal attachment portion.

An embodiment is directed to a method of terminating a cable to an electrical terminal. The method includes: positioning exposed wires of a cable in a wire attachment portion of the terminal; terminating the exposed wires to the wire attachment portion; moving a heat shrinkable sealing device over the exposed wires and the wire attachment portion, the heat shrinkable sealing device having adhesive/sealant retained therein; applying heat to the heat shrinkable sealing device to cause the wire attachment portion and a transition portion of the terminal causing the adhesive/sealant to flow around the exposed wires and causing the heat shrinkable sealing device to recover; and providing a flow barrier to prevent the adhesive/sealant to flow from the wire attachment portion of the terminal to a terminal attachment portion of the terminal.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
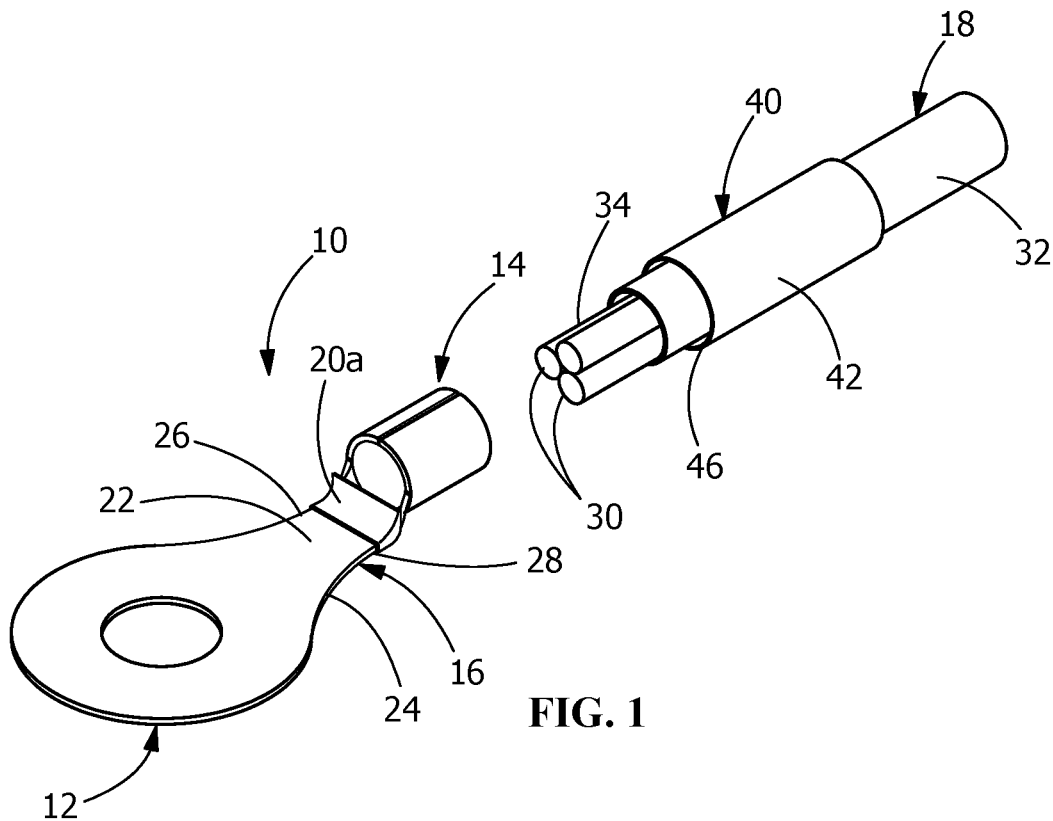
FIG. 1 is a perspective view of a ring-type electrical terminal that includes wire attachment portion, a wire and a sealing sleeve is shown prior to being positioned on the wire attachment portion and prior to the sealing sleeve being recovered, an illustrative adhesive flow-out barrier of the present invention is provided on the electrical terminal.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

With reference to the Figures, FIG. 1 provides an illustration of an electrical terminal 10 that is compatible with the systems, methods, and devices of the present invention. The electrical terminal shown in FIG. 1 is a ring-type terminal; however, the systems, methods, and devices of this invention are also compatible with many other types of electrical terminals such as, for example, spade terminals, hook terminals, flag terminals, push-on terminals, and the like. With reference to FIG. 1, electrical terminal 10 includes terminal attachment portion 12, a wire attachment portion 14 and a transition portion 16 which extends between the terminal attachment portion 12 and the wire attachment portion 14. The terminal attachment portion 12 is configured for connection to a complementary terminal, such as a stud or a post, of an electrical device such as, for example, a battery. The wire attachment portion 14 is configured for connection to a cable 18, such as, but not limited to, one or more electrical wires, which may be connected by welding, soldering, crimping or other suitable attachment methods. The particular configuration of the terminal 10 is shown for illustrative purposes. The terminal attachment portion 12, the wire attachment portion 14 and the transition portion 16 may have varied configurations without departing from the scope of the invention.

Figure 2:
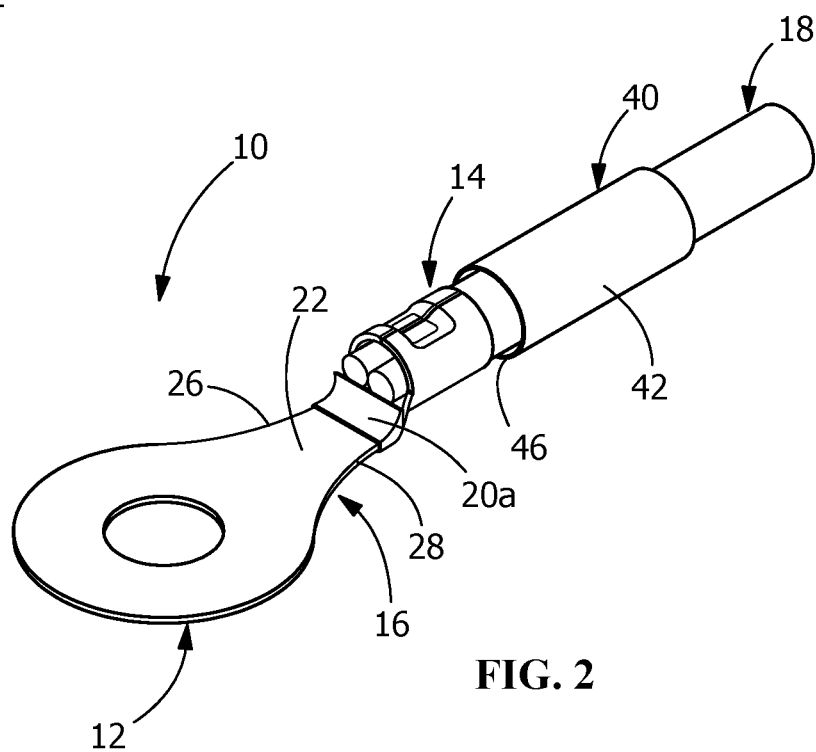
FIG. 2 is a perspective view of the electrical terminal with the wire inserted and terminated to the wire attachment portion.

As best shown in FIGS. 1 and 2, the transition portion 16 of the terminal 10 includes a flow barrier 20. The flow barrier 20 is positioned proximate to the wire attachment portion 14. The flow barrier 20 extends from a first or top surface 22 of the transition portion 16 in a direction away from an oppositely facing second or bottom surface 24 of the transition portion 16. The flow barrier 20 extends from the transition portion 16 in essentially the same direction as the wire attachment portion 14. The flow barrier 20 extends from proximate a first side surface 26 of the transition portion 16 to proximate an opposed second side surface 28 of the transition portion 16.

Figure 3:
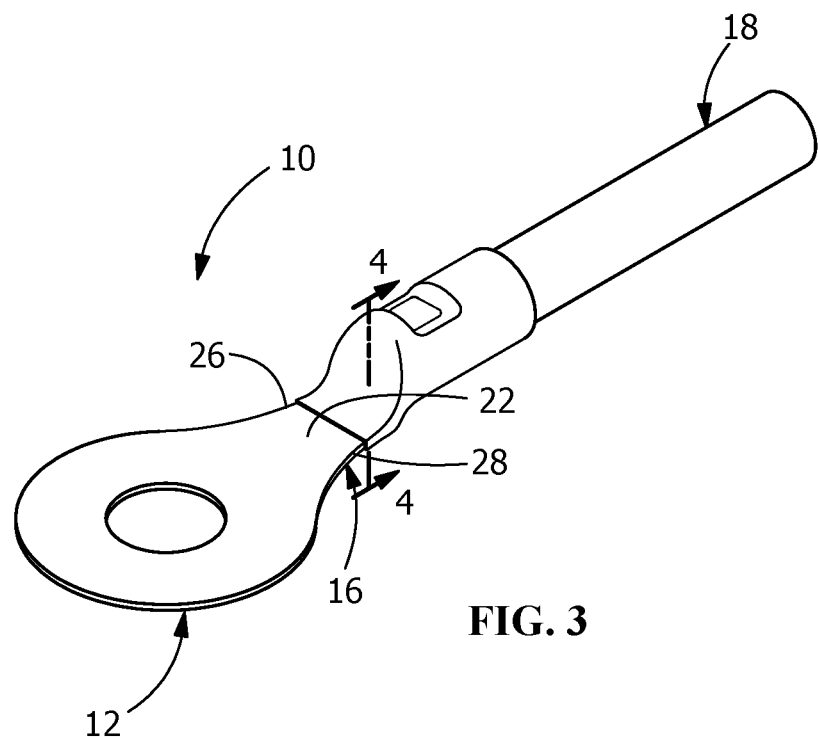
FIG. 3 is a perspective view of the electrical terminal of FIG. 1 with the sealing sleeve positioned on the wire attachment portion and the sealing sleeve recovered.

In the embodiment shown in FIGS. 1 through 3, the flow barrier 20a is a heat shrinkable sleeve which is positioned around the transition portion 16. The heat shrinkable sleeve is positioned about the transition portion 16 and heat is applied such that the heat shrinkable sleeve is recovered to form the flow barrier 20a. The heat shrinkable sleeve forms a seal with the transition portion 16. This embodiment is an illustrative embodiment of the flow barrier being a separate part which is fixed or attached to the terminal.

Figure 5:
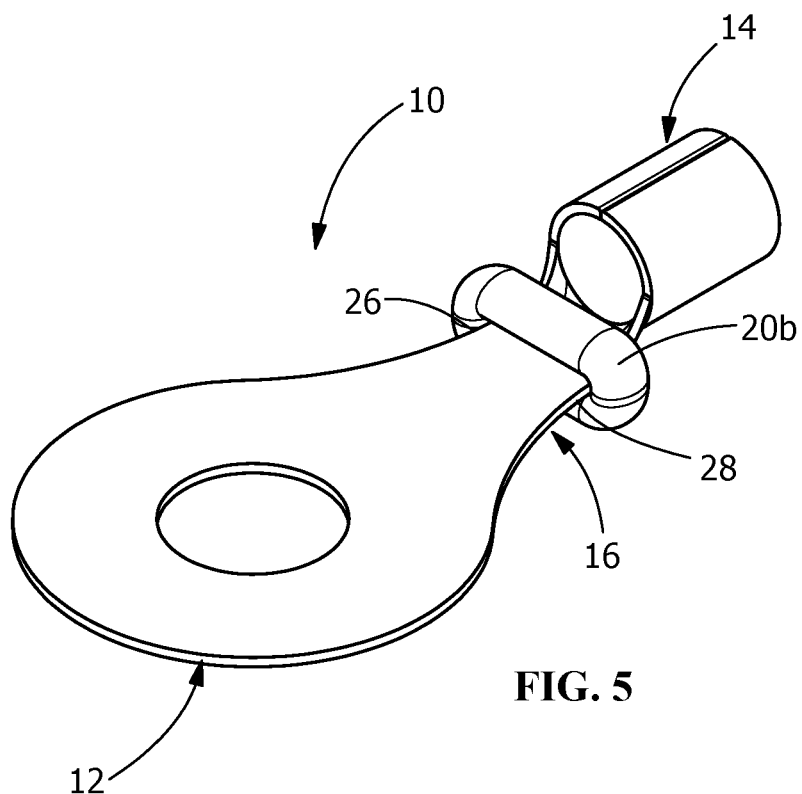
FIG. 5 is a perspective view of an electrical terminal with a first alternate embodiment of the adhesive flow-out barrier provided thereon.

In the embodiment shown in FIG. 5, the flow barrier 20b is an O-ring which is positioned around the transition portion 16. The O-ring is positioned about the transition portion 16 and conforms to the transition portion 16 to form the flow barrier 20b. The O-ring is dimensioned to apply a compressive force to the transition portion 16 when is inserted onto the transition portion 16 to form a seal with the transition portion 16. This embodiment is an illustrative embodiment of the flow barrier being a separate part which is positioned on the terminal.

Figure 6:
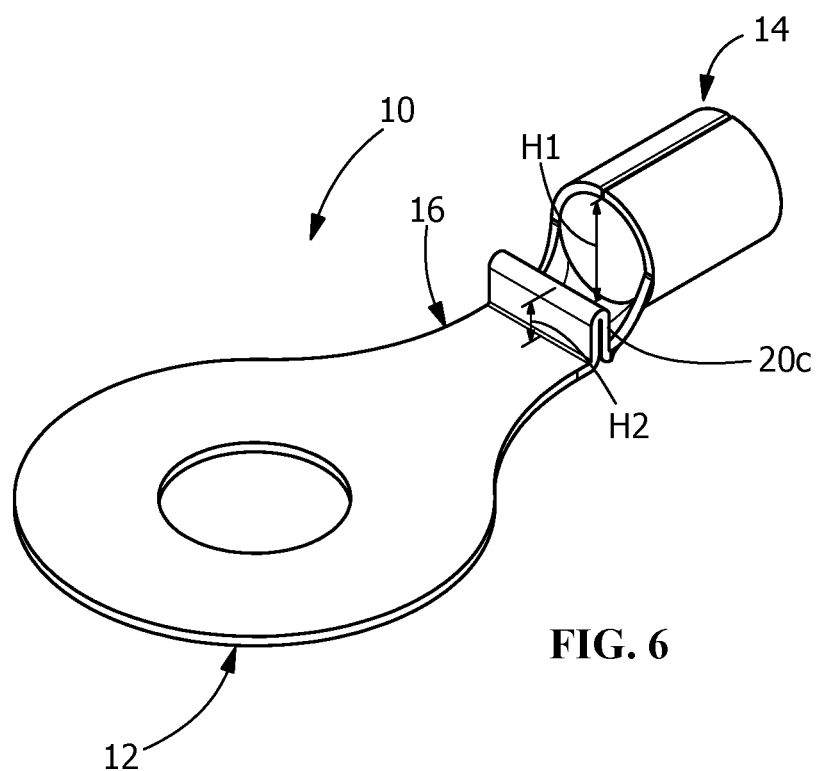
FIG. 6 is a perspective view of an electrical terminal with a second alternate embodiment of the adhesive flow-out barrier provided thereon.

In the embodiment shown in FIG. 6, the flow barrier 20c is a one or more dimples, peaks or shoulders stamped from the transition portion 16. This embodiment is an illustrative embodiment of the flow barrier being integrally formed with the terminal. However, other configurations of the flow barrier 20 may be used without departing from the scope of the invention.

In each of the illustrative embodiments, the flow barrier 20 extends from the first surface 22 of the transition portion 16 a distance H2 (FIG. 6) which is less than the height H1 of the wire attachment portion 14. In various illustrative embodiments, the height H2 of the flow barrier 20 is less than one-half the height H1 of the wire attachment portion 14, the height H2 of the flow barrier 20 is less than one-fourth of the height H1 of the wire attachment portion 14, the height H2 of the flow barrier 20 is greater than one-fourth of the height H1 of the wire attachment portion 14, or the height H2 of the flow barrier 20 is between one-half to one-fourth of the height H1 of the wire attachment portion 14.

In the embodiment shown, the cable 18 has a plurality of wires 30 with an insulation sleeve 32. The wires 30 are exposed at a striped end 34 of the cable 18. In the embodiment shown, three wires 30 are provided, however, other numbers of wires can be used.

As shown in FIGS. 1 and 2, a sealing sleeve 40 is provided on the cable 18. The sealing sleeve 40 includes a piece of shrinkable tubing 42 with a sealant/adhesive 44 positioned inside. The sealant/adhesive 44 may be in the form of a ring, sleeve, full circular profile, semi-circular profile, or other profiled geometry. The shrinkable tubing 42 can be a single layer or multilayer tubing. The shrinkable tubing 42 may be a polymeric component that shrinks on the application of heat. Such shrinkable tubing may include, but is not limited to, heat shrinkable tubing or tape. The term sealant/adhesive includes, but is not limited to, sealants and adhesives which are viscoelastic materials that have an ability to flow under suitable stimulus like temperature and/or pressure. Examples of such materials are hot melt adhesives and butyl mastics. The sealant/adhesive 44 is placed within the shrinkable tubing 42 adjacent to or proximate a leading edge 46 of the shrinkable tubing 22. The sealant/adhesive 44 may be a high viscosity sealant/adhesive, such as, for example, sealant/adhesive which has a viscosity that is greater than 20 Pa·s at an installation temperature which correlates to a designated or rated temperature. The sealant/adhesive 44 may be a low viscosity sealant/adhesive, such as, for example, sealant/adhesive which has a viscosity that is less than 20 Pa·s at an installation temperature which correlates to a designated or rated temperature. The sealant/adhesive 44 may be a combination of low viscosity sealant/adhesive and high viscosity sealant/adhesive. The sealant/adhesive 44 has a flow behavior such that it conforms to the surface of the wire attachment portion or surface of the plurality of wires while allowing the sealant/adhesive 44 to displace air efficiently inside the cable 18 intended to be sealed to create a robust seal.

In use, exposed wires 30 at the stripped end 34 of the cable 18 are moved into the wire attachment portion 14 of the terminal 10. The insertion of the wires 30 into the wire attachment portion 14 continues until a portion of the wires 30 engages the flow barrier 20 of the transition portion 16. The flow barrier 20 provides a wire stop to prevent the further insertion of the wires 30 into wire attachment portion 14. This prevents the wires 30 from being inserted to the terminal attachment portion 12 and interfering therewith.

With the exposed wires 30 properly positioned in the wire attachment portion 14 of the terminal 10, the wire attachment portion 14 is terminated to the wires 30, as shown in FIG. 2. In the embodiment shown, the wire attachment portion 14 is crimped to the wires, but other methods of termination can be used.

With the exposed wires 30 properly terminated to the wire attachment portion 14, the sealing sleeve 40 is moved over the exposed wires 30 and the wire attachment portion 14. Heat is then applied to the sealing sleeve 40. Upon the application of heat (e.g., in an infrared oven for 30 seconds or other time period) after installation of the shrinkable tubing 42 over the electrical terminal 10, the sealant/adhesive 44 melts and flows across the exposed wires 30 of the cable 18 filling any present air voids. The shrinkable tubing 42 shrinks to encapsulate the exposed wires 30 and the wire attachment portion 14 of the electrical terminal 10 (as shown in FIG. 3), thereby substantially sealing the melted sealant/adhesive 44 within the shrinkable tubing 40.

During the heating process, the flow barrier 20, which is positioned proximate the leading edge 46 of the shrinkable tubing 22 cooperates with the sealant/adhesive 42 to block and effectively constrain the flow or oozing of the sealant/adhesive 42 in the direction of the terminal attachment portion 12, thereby reducing or preventing any problematic contamination of the terminal attachment portion 12 by the sealant/adhesive 42. While in some instances a small amount of sealant/adhesive 42 may travel onto the terminal attachment portion 12, the amount will be insignificant with regard to the functioning of the electrical terminal 10.

Figure 4:
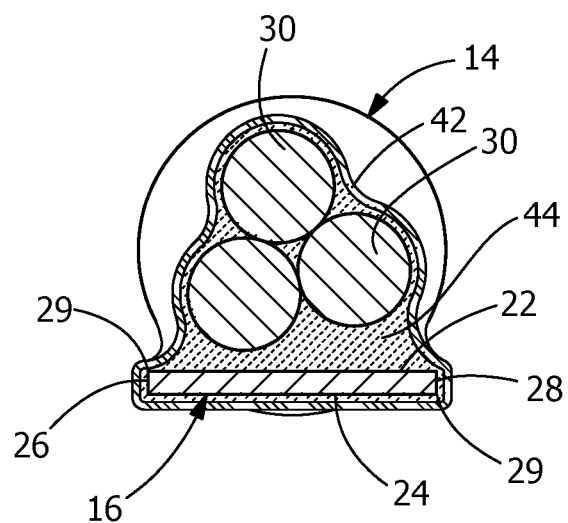
FIG. 4 is a cross-sectional side view taken along line 3-3 of FIG. 2.

During the heating process, the flow barrier 20 also blocks and effectively constrains the flow or oozing of the sealant/adhesive 42 away from the exposed wires 30 of the cable 18, the transition portion 16 and the wire attachment portion 14. The retention of the sealant/adhesive 42 is the desired area allows the sealant/adhesive 42 to properly and evenly flow around the exposed wires 30, the transition portion 16 and the wire attachment portion 14 to provide a proper seal. As shown in FIG. 4, the sealant/adhesive 42 is provided around the wires 30 and around the transition portion 16, including around the first surface 22, the second surface 24, the first side surface 26, the second side surface 28 and the corners 29 provided therebetween. The controlled and even flow of the sealant/adhesive 42 prevents contaminants and/or water from affecting the electrical connection between the wires 30 and the terminal 10.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed:

1. An electrical terminal, comprising:
   a terminal attachment portion;
   a wire attachment portion for receiving wires of a cable therein;
   a transition portion extending between the terminal attachment portion and the wire attachment portion;
   a flow barrier provided on the transition portion proximate an end of the transition portion, the flow barrier has a flow barrier height which is greater than one-fourth of a height of the wire attachment portion;
   wherein the flow barrier acts as a wire stop to properly position the wires in the wire attachment portion;
   wherein the flow barrier constrains an adhesive/sealant applied to the wires positioned in the wire attachment portion from flowing from the wire attachment portion to the terminal attachment portion.

2. The electrical terminal as recited in claim 1, wherein the flow barrier is integrally formed with the terminal.

3. The electrical terminal as recited in claim 2, wherein the flow barrier is a heat shrinkable sleeve.

4. The electrical terminal as recited in claim 1, wherein the flow barrier is a separate part from the terminal which is positioned on the terminal.

5. The electrical terminal as recited in claim 4, wherein the flow barrier is an O-ring.

6. The electrical terminal as recited in claim 1, wherein the flow barrier is a separate part from the terminal which is fixed to the terminal.

7. The electrical terminal as recited in claim 6, wherein the flow barrier is at least one dimple which extends from a top surface of the transition portion.

8. The electrical terminal as recited in claim 1, wherein the terminal is a ring terminal.

9. The electrical terminal as recited in claim 1, wherein the height of the flow barrier is less than the height of the wire attachment portion.

10. An assembly of an electrical terminal with a cable terminated thereto, the assembly comprising:
    the terminal having a terminal attachment portion, a wire attachment portion for receiving the cable therein, and a transition portion which extends between the terminal attachment portion and the wire attachment portion, a flow barrier provided on the transition portion proximate an end of the transition portion, the flow barrier has a flow barrier height which is greater than one-fourth of a height of the wire attachment portion;
    the cable having wires and an insulation sleeve, a sealing device provided on the cable and extending over the wire attachment portion of the terminal, the sealing device being a heat shrinkable tubing with an adhesive/sealant provided therein;
    wherein the flow barrier acts as a wire stop to properly position the wires in the wire attachment portion;
    wherein the flow barrier constrains the adhesive/sealant from flowing from the wire attachment portion to the terminal attachment portion.

11. The assembly as recited in claim 10, wherein the flow barrier is integrally formed with the terminal.

12. The assembly as recited in claim 11, wherein the flow barrier is a heat shrinkable sleeve.

13. The assembly as recited in claim 10, wherein the flow barrier is a separate part from the terminal which is positioned on the terminal.

14. The assembly as recited in claim 13, wherein the flow barrier is an O-ring.

15. The assembly as recited in claim 10, wherein the flow barrier is a separate part from the terminal which is fixed to the terminal.

16. The assembly as recited in claim 15, wherein the flow barrier is at least one dimple which extends from a top surface of the transition portion.

17. The assembly as recited in claim 10, wherein the height of the flow barrier is less than the height of the wire attachment portion.

* * * * *